United States Patent [19]

Takemura et al.

[11] 4,400,706
[45] Aug. 23, 1983

[54] DISCHARGE RECORDING MEDIUM

[75] Inventors: Shuji Takemura, Chiba; Kazumi Hirakawa; Tsuneto Yoshizumi, both of Tokyo, all of Japan

[73] Assignee: Honshu Seishi Kabushiki Kaisha, Tokyo, Japan

[21] Appl. No.: 287,686

[22] Filed: Jul. 28, 1981

[30] Foreign Application Priority Data

Jul. 30, 1980 [JP] Japan ................................ 55-103593

[51] Int. Cl.³ .......................................... G01D 15/06
[52] U.S. Cl. ................................................ 346/135.1
[58] Field of Search ..................... 346/1.1, 108, 135.1

[56] References Cited

U.S. PATENT DOCUMENTS

| | | | |
|---|---|---|---|
| 3,514,325 | 5/1970 | Davis et al. | 346/135.1 |
| 3,516,911 | 6/1970 | Hopps | 346/135.1 X |
| 3,665,483 | 5/1972 | Becker et al. | 346/76 L X |
| 3,861,952 | 1/1975 | Tokumoto et al. | 346/135.1 X |
| 4,042,936 | 8/1977 | Yoshikawa | 346/135.1 X |

Primary Examiner—Donald A. Griffin
Attorney, Agent, or Firm—Armstrong, Nikaido, Marmelstein & Kubovcik

[57] ABSTRACT

A discharge recording medium having a colored insulating layer, a metal-vaporized layer and, as required, a protection layer formed in that order on a support member, wherein the colored insulating layer contains a graphite powder having particles of a specifically determined average size in an amount according to a specifically determined ratio with respect to a bonding resin in the colored insulating layer.

5 Claims, 1 Drawing Figure

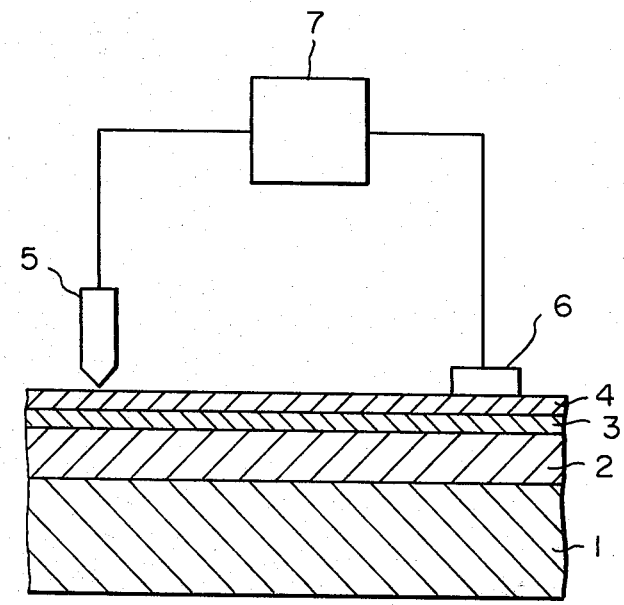

DISCHARGE RECORDING MEDIUM

BACKGROUND OF THE INVENTION

1. Field of the Invention

The present invention relates to a discharge recording medium having a colored layer, a metal-vaporized layer and, as required, a protection layer formed in that order on a support member composed of, for example, a paper or plastic film.

2. Description of the Prior Art

In recent years, a so-called discharge recording medium has been used extensively to record characters, symbols, figures and the like in response to electric data signals.

According to the art of discharge recording employing such a discharge recording medium, a signal voltage is applied across a recording stylus and an earth electrode (ground electrode) on the surface of discharge recording medium which has a colored layer (lower layer) and a metal-vaporized layer (upper layer) formed on a support member, whereby the metal-vaporized layer beneath the recording stylus is destroyed by the electric discharge, so that the lower colored layer is exposed and made visible.

The colored layer of the discharge recording member consists of a coloring agent such as carbon black or dye-stuff and a bonding resin, and has a great surface resistance, i.e., has electrically insulating property.

When a recording voltage is applied to the above-mentioned conventional recording material, however, a concentrated discharge takes place in a portion of the recording layer, a heavy current flows instantaneously, and the recording layer is destroyed, giving rise to the occurrence of the following undesirable phenomena:

(i) Picture lines and dots are coarsened with the result that the picture becomes obscure.

(ii) Contaminants are generated in large amounts by the discharge, and fused (deposited) onto the recording stylus. Therefore, the recording stylus loses its electrical conductivity, and it becomes difficult to continue recording. In extreme cases, it becomes virtually impossible to carry out recording.

(iii) The metal-vaporized layer is destroyed in the place where the earth electrode is located (i.e., earth discharge), and the picture becomes obscure.

In recent years, in particular, the discharge recording apparatus of this type can be represented by a so-called multistylus-type apparatus employing a head which incorporates 5 to 200 recording styluses.

With this apparatus, however, a signal voltage must be simultaneously applied to a plurality of recording styluses. Therefore, the discharge current as a whole becomes very great, and the above-mentioned defects of the conventional recording media tend to appear even more strikingly.

In order to prevent the above-mentioned defects, therefore, there has been proposed a method of increasing the amount of carbon black in the colored layer in an attempt to make the colored layer electrically insulative (surface resistance is $10^8$ ohms or smaller, see Japanese Patent Laid-Open No. 51-101544, Japanese Patent Publication No. 54-15415).

The above method makes it possible to suppress the occurrence of the above-mentioned phenomena (ii) and (iii), but invite the following new defects.

(1) Since the colored layer is electrically insulative, the discharge current density is reduced when the recording is being made. Therefore, the discharge energy is insufficient, lines and dots correspondingly become too narrow, and discharge becomes defective. This, of course, also means that the picture becomes obscure.

(2) The vaporized metal and the electrically conductive carbon contained in the colored layer form a battery. Therefore, electrolytic corrosion takes place, and the surface is blackened (preserving property is lost).

(3) Carbon black contained in large amounts in the colored layer flies off when the record is being made, and pollutes the recording medium, recording apparatus, and the surrounding environment.

Under such circumstances, the inventors of the present invention have conducted a keen study in order to overcome various defects such as earth discharge, melt-adhesion (deposition), and the like, without making the colored layer electrically insulative. The inventors have found that when a graphite powder is contained in the colored layer, it is possible to improve the discharge characteristics when the recording is being made, to prevent the earth discharge, melt-adhesion (deposition) phenomena, to obtain sharp dots and lines, to eliminate the appearance of scanning lines, to obtain a vivid record and, hence, to obtain a discharge recording medium having excellent preservability, and have thus accomplished the present invention.

SUMMARY OF THE INVENTION

The present invention relates to a discharge-breakdown recording medium.

The object of the present invention is to provide a discharge-breakdown recording medium which exhibits excellent effects when used with the conventional single-stylus-type recording apparatus, and especially when used with the multistylus-type recording apparatus.

Another object of the present invention is to provide a discharge recording medium which prevents the occurrence of earth discharge phenomenon or melt-adhesion (deposition) phenomenon, which eliminates the appearance of scanning lines, which produces a vivid record, and which exhibits excellent preservability.

Other objects and features will become obvious from the following description.

BRIEF DESCRIPTION OF THE DRAWING

The drawing schematically illustrates, on an enlarged scale, a discharge recording medium according to the present invention, used in a discharge-breakdown recording apparatus, in which reference numeral 1 denotes a support member, 2 denotes a colored layer, 3 denotes a metal-vaporized layer, 4 denotes a protection layer which is provided as required, 5 denotes a discharge recording stylus, 6 denotes an earth electrode, and 7 denotes a power supply (alternating current or direct current).

DESCRIPTION OF THE PREFERRED EMBODIMENT

As shown in the accompanying drawing on an enlarged scale, the present invention deals with a discharge recording medium having a colored layer 2, a metal-vaporized layer 3, and, as required, a protection layer 4, formed in that order on a support member 1, wherein the colored layer contains a predetermined amount of graphite powder having particle diameters that lie within a predetermined range, and has a surface resistance of $10^{10}$ to $10^{13}$ ohms.

According to the present invention, the support member 1 consists of a paper or plastic film that is usually used in a discharge recording medium. The metal-vaporized layer 3 consists of a metal such as aluminum, zinc, tin or magnesium. The metal-vaporized layer is formed by a customary method such as a vacuum-vaporization method. The thickness of the metal-vaporized layer varies to some extent depending upon the surface properties of the colored layer on which it is applied, but usually ranges from about 200 to 1500 angstroms. In terms of surface resistivity, the metal-vaporized layer has a resistance of as small as 10 to 1 ohm per square centimeter (as measured in accordance with the method of measuring metal film resistivity stipulated under JIS C-2316). The discharge takes place less easily when the amount of the vaporized metal is large, i.e., when the surface resistance is small. On the other hand, when the amount of the vaporized metal is too small, i.e., when the surface resistance is high, the colored layer is exposed, the appearance is deteriorated, and the preservability is reduced. However, there is no particular limitation with regard to selecting the support member, forming the metal-vaporized layer, or with regard to the amount of the metal vaporized.

In order to preclude the occurrence of scars or contamination from fingerprints according to the present invention, the surface of the metal-vaporized layer is further coated with a protection layer consisting of various resins, or various resins and a pigment such as zinc oxide or titanium dioxide, or a lubricant such as metal soap of a fatty acid.

The embodiment of the present invention will be discussed below concretely.

The feature of the present invention resides in the colored layer 2.

More specifically, the feature resides in that the colored layer contains a predetermined amount of graphite powder having predetermined particle diameters.

According to the present invention, either natural or artificial graphite can be used with equal effect.

Like carbon black, graphite is an allotrope of carbon. They, however, have quite different physical properties.

Physical properties of carbon

| | Graphite | Amorphous carbon* |
|---|---|---|
| Specific gravity | 2.26 (20°) | <2 |
| Linear expansion coefficient | — | $0.540 \times 10^{-5}$ |
| Specific heat cal/deg · g | 0.167 | 0.204 |
| Heat conductivity cal/deg · cm · sec | $37.7 \times 10^{-3}$ | $8.49 \times 10^{-3}$ |
| Heat of combustion cal/g | 7850 | 8060 |
| Resistivity ohms · cm | $0.2 \sim 4 \times 10^{-3}$ | $4.1 \times 10^{-3}$ |

*Varies depending upon the processing method. Therefore, these values serve only as rough indications for carbon black.

Commercially available graphite powder usually has an average particle diameter over a range of 0.5 $\mu$m to 250 $\mu$m. On the other hand, commercially available carbon black usually has an average particle diameter over a range of 0.02 $\mu$m to 0.3 $\mu$m. Therefore, they can be distinguished by observation through an electron microscope, or they can be more easily distinguished relying upon the oil absorption or the apparent volume.

According to the present invention, the colored layer contains a graphite powder having an average particle diameter of 0.1 to 50 $\mu$m, and preferably an average particle diameter of 0.5 to 30 $\mu$m. It is recommended to use graphite powder having particle sizes as uniform as possible. As required, therefore, the particle diameter may be adjusted by using a ball mill or a sand mill. When the particle diameters are too small, the aforementioned defects (1) to (3) are exhibited as when carbon black alone is used. On the other hand, when the particle diameters are too large, the surface of the recording paper is abnormally coarse, dots become non-uniform, and lines become obscure.

According to the present invention, the content of graphite powder varies depending upon the type of the graphite powder that is to be used. Namely, the electric and physical properties vary depending upon the type of the graphite powder, and it is difficult to specify the amount. The graphite powder, however, should be contained in an amount of greater than about 15 parts by weight, and preferably greater than about 20 parts by weight, per 100 parts by weight of the bonding resin.

Examples of the bonding resin (film-forming agent) include thermoplastic resins or thermosetting resins that are usually used for forming a colored layer of a discharge recording medium. More particularly, the examples include polyvinyl acetate, polyvinyl chloride, vinyl chloride/vinyl acetate copolymer, polyvinyl acetal, polyvinyl butyral, acrylic resin, methacrylic resin, polyethylene, polypropylene, ethylene/vinyl acetate copolymer, polystyrene, cellulose resin, epoxy resin, phenolic resin, furan resin, melamine resin, urea resin, alkyd resin, silicone resin, petroleum resin, polyester resin, natural or synthetic rubber, polyvinyl alcohol, and the like. Two or more of these compounds may be used in combination.

Here, considering the preserving property of the metal-vaporized layer, a water-insoluble resin is preferred to the water-soluble resin. An ordinarily used organic solvent can be used as the non-aqueous solvent.

From the standpoint of preventing discharge contaminants, odor, and tail-towing phenomenon of the picture when the recording is being made, suitable resins to be used include an acrylic resin, methacrylic resin, cellulose resin and polyester resin, and more preferably a cellulose resin.

Particular examples of the cellulose resin include nitrocellulose, cellulose acetate, cellulose acetate butyrate, cellulose propionate, ethyl cellulose, and the like which are soluble in an organic solvent. Two or more kinds of these resins may be used in combination.

When the bonding resin used in the colored layer lacks flexibility or softness, it is recommendable to add a commercially available plasticizer. Examples of the plasticizer for the resin include phthalic acid esters, fatty acid esters, maleic acid esters, fumaric acid esters, trimellitic acid esters, glycerine esters, phosphoric acid esters, or polyester-type high-molecular plasticizers of the type of adipic acid, sebacic acid and fumaric acid, and epoxylated ester-type plasticizer. Two or more kinds of these plasticizers may be used with in combination.

In order to impart colors, furthermore, it is possible to add carbon black, pigments and dyestuffs. The smaller the particle size, the more the carbon black or pigment exhibits its color-imparting effect. The carbon black or the pigment should have a particle size of smaller than 0.1 $\mu$m, preferably smaller than 0.05 $\mu$m.

The amount of the pigment can be arbitrarily determined depending upon the required concentration of the picture that is to be recorded.

The paint for forming the colored layer is mixed or dispersed in a customary manner. Examples of the dispersing device will include a roll mill, ball mill, pebble mill, sand mill, attritor, colloid mill, stone mill, high-speed impact mill, and high-speed impeller dispersing machine.

The paint for forming colored layer can be coated in a customary manner. Particular examples of the coating apparatus include blade coater, rod coater, knife coater, squeeze coater, reverse roll coater, transfer roll coater, gravure coater, and kiss-roll coater. Among them, the rod coater, reverse roll coater, transfer roll coater, gravure coater, squeeze coater and kiss-roll coater are preferable.

The amount of paint used for forming the colored layer varies depending upon the surface smoothness of the support member, absorbency and the kind of the coater. In general, however, the paint is used in an amount of from about 1 to about 10 g per square meter.

Thus, an electrically insulating colored layer is applied onto the support member.

What is important in the present invention is that the thus formed electrically insulating colored layer has a surface resistance of about $10^{13}$ to $10^{10}$ ohms.

If the surface resistance of the colored layer becomes greater than $10^{14}$ ohms, the effects and objects contemplated by the present invention are not achieved, and earth return or fusion develops.

When the surface resistance of the colored layer becomes smaller than $10^{10}$ ohms, on the other hand, density of the discharge current is reduced, the discharge energy is not sufficiently obtained, the dots or lines become too narrow, and the failure of discharge makes the picture obscure. With regard to the preserving property, graphite powder exhibits behavior similar to that of carbon black. That is, graphite powder can form a local battery with the vaporized metal, and gives rise to corrosion of the vaporized metal. In order for the surface resistance of the colored layer to assume a value that lies within the abovementioned range, the content of the graphite powder should be so adjusted as to fall within the range already mentioned.

In case the coloring agent (such as pigment or carbon black) is electrically conductive, the surface resistance should be adjusted by taking the amount of the coloring agent into consideration.

It is difficult to determine the amount of the coloring agent since its conductivity greatly varies depending upon its type. However, since carbon black becomes a cause of corrosion to the vaporized metal, its amount should be as small as possible.

It is considered that the graphite powder in the colored layer when the recording is being made participates in the discharge phenomenon as mentioned below. As is well known, graphite powder is an electrically conductive material like carbon black. When compared with the carbon black, however, graphite powder has physical properties that are altogether different from those of carbon black, and it is assumed that the radically different physical properties of graphite powder help improve the discharge characteristics.

The graphite powder employed in the present invention has an average particle diameter of 0.5 μm to 250 μm, which is greater than the particle sizes of ordinarily used carbon black, which range from 0.02 to 0.3 μm. If considered microscopically, then, the electrically conductive particles of relatively large sizes are present in the colored layer underneath the recording stylus. Consequently, when the recording voltage is applied, the discharge is induced onto the electrically conductive particles. In other words, the discharge is induced on the individual graphite particles underneath the recording stylus, so the discharge is divided over a plurality of particles. Unlike the concentrated discharge which takes place instantaneously, therefore, a heavy current does not flow instantaneously, and the earth discharge and the fusion (deposition) caused by the discharge contaminants are prevented.

Furthermore, since the discharge is divided in a plurality of particles the total discharge energy is greater than in the case when the colored layer is insulating. Consequently, dots and lines are not narrowed, and a vivid record having increased printing concentration is obtained.

When carbon black is used instead of graphite, on the other hand, the discharge does not take place in a divided manner since the particle sizes of the carbon black are too fine. Namely, the discharge takes place locally and in a concentrated manner, and a heavy current flows instantaneously. Therefore, earth discharge and fusion (deposition) occur.

As mentioned above, the discharge recording medium of the present invention contains graphite powder in the colored layer, with the particle diameters of the graphite particles being considerably greater than those of the carbon black particles. When the recording is being made, therefore, the discharge is divided in a plurality of particles. Consequently, the discharge occurs more suitably, and earth discharge or fusion (deposition) are prevented, the appearance of scanning lines is eliminated, and a vivid record is obtained.

Furthermore, in order to coarsen the surface of the metal-vaporized layer 3 formed on the colored layer 2 and so reduce the metallic luster, a surface coarsening agent such as silica, aluminum hydroxide, titanium oxide, barium sulfate or organic pigment may be added.

The particle diameters of the surface coarsening agent should be as uniform as possible, with the average particle size being from 0.5 to 30 μm, preferably from 2 to 10 μm. The amount of the surface coarsening agent should be determined depending upon the degree of metallic luster of the metal-vaporized layer. Usually, the surface coarsening agent is added in an amount of about 10 to 50 parts per 100 parts of the bonding resin. If too much surface coarsening agent is added, the color of the metal-vaporized layer becomes grayish, and the preservability is also deteriorated. Therefore, the surface coarsening agent should be added in as small an amount as possible. What is important is that the surface resistance of the colored layer after treatment is $10^{13}$ to $10^{10}$ ohms.

EXAMPLE 1

Two hundred grams of a mixture solution (solid component concentration, 15%) composed of components as shown in Table 1 was blended with 150 cc of glass beads (1 to 1.5 mm in diameter), fed into a ⅛G batch-type six-cylinder sand grinder (manufactured by Igarashi Kikai Seizo Co.), and was subjected to dispersion at a disc running speed of 2000 rpm for 1 hour to obtain a paint for forming the colored layer. This paint was then applied onto a high-quality paper with a density of 50 g/m² in an amount of 5 g/m² (dry weight), to thereby form a colored layer.

Then, an aluminum-vaporized layer having a surface resistance of 3 ohms was formed on the colored layer by a vacuum vaporization method, thereby to prepare a discharge recording medium.

Records were made on the thus obtained discharge recording media using a discharge record printer, Model SP-2 (multistylus fixed-type having 120 pins) manufactured by Nippon Hamlin Co., at a recording voltage of 50 volts. The preservability was evaluated after the printed media were left to stand in an environment of 40° C. and 90% RH for one week. The results are shown in Table 2.

TABLE 1

| Composition | Specimen No. | | | | | |
|---|---|---|---|---|---|---|
| | 1-1 | 1-2 | 1-3 | 1-4 | 1-5 | 1-6 |
| Graphite AUP (average diameter, 0.7μ) produced by Nippon Graphite Co. | 2 | 3 | 4 | 1 | 5 | 6 |
| Nitrocellulose (RS-2, produced by Daicel Co.) *1 | 10 | 10 | 10 | 10 | 10 | 10 |
| Dioctyl phthalate (produced by Daihachi Kagaku Co.) | 3.5 | 3.5 | 3.5 | 3.5 | 3.5 | 3.5 |
| Ethyl acetate | Added in such amounts that the solid content was 15% by weight. | | | | | |

*1 Nitration degree (N %), 11.5–12.2. Viscosity, 15.0–24.9 seconds.

TABLE 2

| | Specimen No. | Surface resistance of colored layer *3 | Presence of earth discharge *4 | Presence of fusion (deposition) *5 | Vividness of record *6 | Scanning line *7 | Preservability of recorded paper *8 |
|---|---|---|---|---|---|---|---|
| Products of the invention | 1-1 | 2 × 10¹³ ohms | O | O | O | O | O |
| | 1-2 | 1 × 10¹² | O | O | O | O | O |
| | 1-3 | 4 × 10¹⁰ | O | O | O | O | O |
| Comparative products *1 | 1-4 | 2 × 10¹⁴ | X | X | O | O | O |
| | 1-5 | 7 × 10⁷ | O | O | Δ-X | Δ | Δ |
| | 1-6 | 3 × 10⁵ | O | O | X | Δ | X |
| Comparative products *2 | 1-7 | 3 × 10¹¹ | X | X | O | Δ | O |
| | 1-8 | 5 × 10⁶ | O | O | X | X | X |

*1 Comparative products 1-4 to 1-6 were graphite with surface resistance in the colored layer of greater than 10¹⁴ ohms or smaller than 10¹⁰ ohms.
*2 Comparative products 1-7 and 1-8 were carbon black only. The compositions were as shown in Table 3 below.

TABLE 3

| Composition | Specimen No. | |
|---|---|---|
| | 1-7 | 1-8 |
| Carbon black (Asahi No. 60, having an average particle diameter of 0.05μ, produced by Asahi Carbon Co.) | 2.5 | 4 |
| Nitrocellulose (RS-2, produced by Daicel Co.) | 10 | 10 |
| Dioctyl phthalate (produced by Daihachi Kagaku Co.) | 3.5 | 3.5 |
| Ethyl acetate | Added in such amounts that the solid content was | |

TABLE 3-continued

| Composition | Specimen No. | |
|---|---|---|
| | 1-7 | 1-8 |
| | 15% by weight. | |

*3 Measured in an environment of 20° C. and 60% RH, using a TR42 electrode box (manufactured by Takeda Riken Kogyo Co.) at a measuring voltage of 100 volts.
*4 Earth discharge
 O: Did not occur
 X: Occurred
*5 Fusion (deposition)
 O: Did not occur
 X: Occurred
*6 Vividness of record
 O: Discharge takes place sufficiently, and the recorded picture is vivid.
 Δ: Discharge is slightly insufficient, recorded dots have small areas, and the picture concentration is low.
 X: Discharge is insufficient, or discharge takes place non-uniformly.
*7 Scanning lines:
 O: Not observable
 Δ: Slightly observable
 X: Observable
*8 Metal-vaporized layer:
 O: Not corroded and not blackened.
 Δ: Slightly blackened by corrosion, and presents a problem.
 X: Considerably blackened by corrosion, and is not practicable.

As will be obvious from the results of Table 2, both the recording characteristics and preserving properties are satisfied only when the colored layer contains graphite and the surface resistance ranges from $10^{10}$ to $10^{13}$ ohms.

EXAMPLE 2

Two hundred grams of a mixture solution consisting of components at ratios shown in Table 4 was dispersed under the same conditions as in Example 1, to prepare a paint for forming a colored layer.

The paint was applied onto a high-quality paper with a density of 50 g/m² to an amount of 5 g/m² (dry weight), to thereby form a colored layer. Aluminum was then vaporized onto the colored layer so that the surface resistance was 3 ohms. Discharge recording media were thus prepared. The discharge recording media were tested with regard to their recording characteristics and preservability in the same manner as in Example 1. The results are shown in Table 5.

TABLE 4

| Composition | Specimen No. | | |
|---|---|---|---|
| | 2-1 | 2-2 | 2-3 |
| Graphite (Blue P, average particle diameter 2μ, produced by Nippon Graphite Co.) | 5 | 5 | 5 |
| Nitrocellulose (RS ½, produced by Daicel Co.) | 10 | 10 | 10 |
| Plasticizer (DOP, produced by Daihachi Kagaku Co.) | 3.5 | 3.5 | 3.5 |
| Carbon black (Black Pearls L, | 0 | 2 | 2 |

TABLE 4-continued

| Composition | Specimen No. | | |
|---|---|---|---|
| | 2-1 | 2-2 | 2-3 |
| average diameter 0.02μ, produced by CABOT Co.) | | | |
| Silica (Cyloid 65, average particle diameter 4μ, produced by Fuji Devison Co.) | 0 | 0 | 2.5 |
| Ethyl acetate | Added in such amounts that the solid content was 25% by weight. | | |

TABLE 5

| Specimen No. | Surface resistance of colored layer | Black concentration of colored layer *9 | Earth discharge | Fusion (deposition) | Vividness of record | Scanning line | Appearance of recording paper | Preservability |
|---|---|---|---|---|---|---|---|---|
| 2-1 | $2 \times 10^{12}$ ohms | 1.27 | O | O | O | O | Metallic luster | O |
| 2-2 | $4 \times 10^{11}$ | 1.36 | O | O | O | O | Metallic luster | O |
| 2-3 | $5 \times 10^{11}$ | 1.34 | O | O | O | O | Pale white | O |

*9 Measured using a Macbeth reflection densitometer, Model RD-514 (produced by Macbeth Co., U.S.A.) with a Wratten No. 106 filter.

According to the present invention, as will be obvious from the results of Table 5, a pigment such as carbon black and a surface coarsening agent such as silica can be used in combination for the colored layer.

EXAMPLE 3

One half g/m² (dry weight) of a mixture solution consisting of 5 g of ethyl cellulose (N-22, produced by Hercules Co.), 76 of toluene, and 19 g of ethanol, was applied onto the metal-vaporized layer of the discharge recording materials (Specimens Nos. 1-1, 1-2 and 1-3) of Example 1 to thereby form a protection layer.

The thus formed discharge recording media were tested with regard to their recording characteristics and preservability under the same conditions as in Example 1. Vivid records were obtained without earth discharge or fusion (deposition). The recording media also exhibited good preservability.

What is claimed is:

1. In a discharge recording medium comprising a colored insulating layer comprising an insulating bonding resin with or without a coloring agent, a metal-vaporized layer and, if desired, a protection layer that are formed in that order on a support member, the improvement wherein the colored insulating layer contains a graphite powder having an average particle diameter of 0.1 to 50 μm in amounts of greater than about 15 parts by weight per 100 parts by weight of a bonding resin which is contained in said colored insulating layer, so that the colored insulating layer has a surface resistivity of $10^{10}$ to $10^{13}$ ohms.

2. A discharge recording medium according to claim 1, wherein the graphite powder has an average diameter of 0.5 to 30 μm.

3. A discharge recording medium according to claim 1, wherein the content of the graphite powder is greater than about 20 parts by weight per 100 parts by weight of the bonding resin.

4. A discharge recording medium according to claim 1, wherein the bonding resin is a cellulose resin.

5. A discharge recording medium according to claim 1, wherein the colored insulating layer further contains a small amount of carbon black having particle diameters smaller than 0.1 μm.

* * * * *